United States Patent
Ohya et al.

(10) Patent No.: US 6,765,784 B2
(45) Date of Patent: Jul. 20, 2004

(54) SOLID ELECTROLYTIC CAPACITOR AND MANUFACTURING METHOD FOR THE SAME

(75) Inventors: Kazumasa Ohya, Sendai (JP); Satoshi Arai, Sendai (JP); Takayuki Inoi, Sendai (JP); Yoshihiko Saiki, Sendai (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 10/369,473

(22) Filed: Feb. 20, 2003

(65) Prior Publication Data

US 2003/0169561 A1 Sep. 11, 2003

(30) Foreign Application Priority Data

Feb. 22, 2002 (JP) .......................................... 2002/46248

(51) Int. Cl.$^7$ ................................................. H01G 9/04
(52) U.S. Cl. ........................ 361/523; 361/528; 361/532; 29/25.03
(58) Field of Search ................................ 361/523, 528, 361/529, 530, 532, 533; 29/25.03

(56) References Cited

U.S. PATENT DOCUMENTS 6,400,557 B1 * 6/2002 Watson et al. .............. 361/540

FOREIGN PATENT DOCUMENTS

| JP | 58-157125 A | 9/1983 |
|----|----|----|
| JP | 62-5630 A | 1/1987 |
| JP | 4-123416 A | 4/1992 |

* cited by examiner

Primary Examiner—Anthony Dinkins
(74) Attorney, Agent, or Firm—Frishauf, Holtz, Goodman & Chick, P.C.

(57) ABSTRACT

A solid electrolytic capacitor has an anode terminal and a cathode terminal for external electrical connection that are formed on one surface of a plate-like or foil-like anode member, and a cathode conductor layer formed such that it covers the area of the one surface of the anode member except for the portion where the anode terminal is secured. A first metal plate or metal foil functioning as the cathode terminal is closely joined to the one surface of the cathode conductor layer so as to cover the one surface of the cathode conductor layer. A second metal plate or metal foil is closely joined to the other surface of the cathode conductor layer so as to cover the other main surface of the cathode conductor layer. The first metal plate or metal foil and the second metal plate or metal foil function to intercept the ventilation between the anode member and the outside.

12 Claims, 1 Drawing Sheet

SOLID ELECTROLYTIC CAPACITOR AND MANUFACTURING METHOD FOR THE SAME

This application claims priority to prior application JP 2002-46248, the disclosure of which is incorporated herein by reference.

BACKGROUND OF THE INVENTION

The present invention relates to a solid electrolytic capacitor and a manufacturing method for the same and, more particularly, to a technology effective for achieving a thinner design and a reduced equivalent series resistance (ESR) of a surface-mounted solid electrolytic capacitor.

In recent years, there has been accelerating trend toward compactness, lighter weight, and portability of electronic equipment. With this trend, there has been increasing demand for smaller and thinner electronic components. Portable devices, in particular, are required to be small and thin at the same time. There are severe restrictions on the thickness of the electronic components used with portable devices, meaning that the demand for making thinner electronic components is high.

Under the aforesaid circumstance, not only semiconductor components but passive components, such as electrolytic capacitors, in particular, used for decoupling or the like in a power circuit are required to be smaller and thinner. Hitherto, most of this type of capacitors are made by coating small capacitor elements with a molding resin to form them into small surface-mounted capacitors, which are so-called "chip capacitors," as disclosed in, for example, Japanese Unexamined Patent Application Publication No. 62-005630, Japanese Unexamined Patent Application Publication No. 58-157125, or Japanese Unexamined Patent Application Publication No. 4-123416. Frequently, plate-like or foil-like materials are used for the capacitor elements in order to achieve a thinner design. Conventional capacitors are structurally characterized by the coating with a molding resin.

FIG. 1 shows the section of a surface-mounted solid electrolytic capacitor according to a conventional embodiment. Referring to FIG. 1, a capacitor 1 is constructed of a plate-like anode member 2, a cathode conductor layer 3 covering the majority of the anode member 2, an anode terminal 4 secured to a portion of the anode member 2 that is not covered by the cathode conductor layer 3, a cathode terminal 5 secured to the cathode conductor layer 3, and a coating resin layer 9.

The anode member 2 uses, as its base material, a plate or foil (hereinafter, "plate" will include "foil" unless otherwise specified) of aluminum or tantalum, or an oxide film forming valve metal, such as niobium. The area of the surface of the base material metal plate is expanded by, for example, etching. A metal oxide film (not shown) of the base material metal is deposited on the expanded surface by, for example, anode oxidization. The metal oxide film provides the dielectric of the capacitor.

The cathode conductor layer 3 is constructed of, for example, a solid electrolyte layer, a graphite layer, and a silver paste layer (none of them being shown), which are deposited in this order on the metal oxide film on the surface of the anode member. The solid electrolyte layer uses a conductive polymer, such as polypyrrole, polythiophene, or polyaniline, or a semiconductor material, such as manganese dioxide.

The anode terminal 4 is conductively fixedly connected to the anode member 2 by, for example, laser welding or resistance welding. Meanwhile, the cathode terminal 5 is bonded to the silver paste layer, which is the topmost layer of the cathode conductor layer 3. These anode terminal 4 and the cathode terminal 5 are used for external electrical connection.

The coating resin layer 9 is formed by transfer molding in which a thermosetting resin, such as epoxy resin, is used as the material. The coating resin layer 9 covers the anode member 2, the cathode conductor layer 3, the joint portion between the anode member 2 and the anode terminal 4, and the joint portion between the cathode conductor layer 3 and the cathode terminal 5. The coating resin layer 9 blocks the entry of oxygen and/or moisture from outside.

The anode terminal 4 and the cathode terminal 5 are bent along the side surfaces of the coating resin layer 9, and further bent inward on the bottom surface of the coating resin layer 9, i.e., the mounting surface of the capacitor. The portions of the anode and cathode terminals 4 and 5, respectively, which face each other, are the portions for external connection.

The capacitor is mounted on a mounting wiring board 6 by soldering the portions of the anode and cathode terminals for external connection to lands 7a, and 7b, respectively, of the wiring pattern formed on the wiring board.

As described above, this type of capacitors has conventionally been securing reliability by coating them with a molding resin so as to protect them from external oxygen and/or moisture.

However, when the resin transfer molding is carried out, it is necessary to secure a gap of a certain size or more between the inner wall of a metal mold and a capacitor element in the metal mold in order to allow molten resin to flow in the metal mold. This means that the coating resin layer 9 will always have a thickness of a certain value or more. If a gap of a sufficient thickness for the flow of molten resin is not provided between the capacitor element and the metal mold, then the gap will have a portion not filled with the resin. As a result, the finished capacitor will have a defective portion uncovered by the coating resin layer 9, leading to failure. Such a defective portion will not be capable of blocking oxygen and/or moisture from outside, resulting in deteriorated reliability of the capacitor. Hence, there is limitation in reducing the thickness of a capacitor.

As shown in FIG. 1, the anode terminal 4 and the cathode terminal 5 are temporarily drawn out of the coating resin layer 9, the distal ends of the drawn-out terminals provide external connection. Therefore, the resistances of the anode terminal and the cathode terminal inevitably increase accordingly with a resultant increase in the ESR of the capacitor.

SUMMARY OF THE INVENTION

Accordingly, it is an object of the present invention to provide an electrolytic capacitor that prevents the entry of oxygen and/or moisture from outside, exhibits higher reliability, and has a reduced thickness, as compared with a conventional capacitor coated with a molding resin.

It is another object of the present invention to provide an electrolytic capacitor having lower ESR.

To these ends, according to the present invention, there is provided a solid electrolytic capacitor including an anode terminal and a cathode terminal for external electrical connection that are formed on one surface of a plate-like or foil-like anode member; a cathode conductor layer formed such that it covers the area of the one surface of the anode member except for the portion where the anode terminal is secured; a first metal plate or metal foil functioning as the cathode terminal that is closely joined to the one surface of the cathode conductor layer so as to cover the one surface of the cathode conductor layer; and a second metal plate or metal foil closely joined to the other surface of the cathode conductor layer so as to cover the other main surface of the cathode conductor layer; wherein the ventilation between the anode member and the outside is blocked by the first metal plate or metal foil or the second metal plate or metal foil.

According to another aspect of the present invention, there is provided a manufacturing method for a solid electrolytic capacitor having an anode terminal and a cathode terminal for external electrical connection that are formed on one surface of a plate-like or foil-like anode member, the manufacturing method including a step of forming the anode member by increasing the area of a plate-like or foil-like valve metal and depositing a layer of oxide of a base material valve metal on the surface of the increased area; a step of forming a cathode conductor layer formed such that it covers the area of the one surface of the anode member except for the portion where the anode terminal is secured; a step of electroconductively securing the anode terminal to the portion of the anode member that is not covered by the cathode conductor layer; a step of bonding, to one surface of the cathode conductor layer, a first metal plate or metal foil that has an area larger than the area of the cathode conductor layer on that surface side and functions as the cathode terminal; and a step of bonding, to the other surface of the cathode conductor layer, a second metal plate or metal foil having an area larger than the area of the cathode conductor layer on that surface side.

DESCRIPTION OF THE PREFERRED EMBODIMENTS

Figure 1:
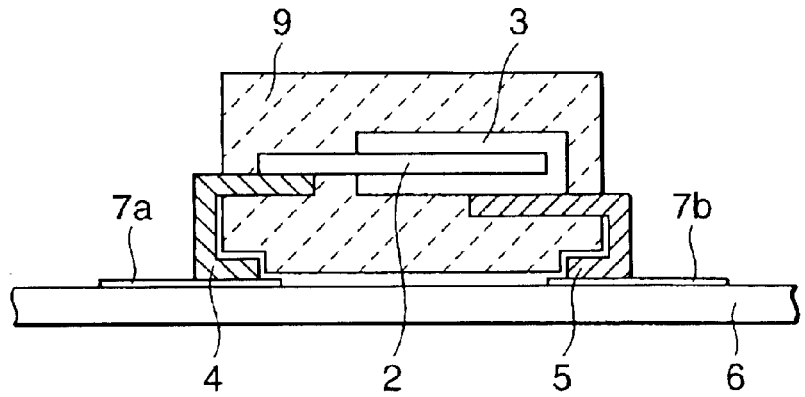
FIG. 1 is a sectional view of a solid electrolytic capacitor according to an embodiment of the present invention.
Figure 2:
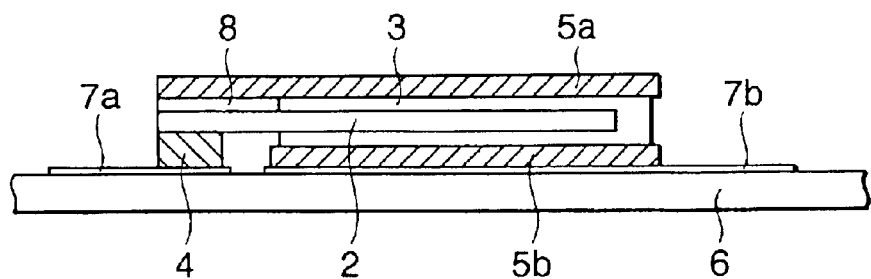
FIG. 2 is a sectional view of a solid electrolytic capacitor according to a modification example.

An embodiment of the present invention will now be described with reference to the accompanying drawings. FIG. 2 is a sectional view of a surface-mounted solid electrolytic capacitor according to an embodiment of the present invention. In the solid electrolytic capacitor according to the present invention, the two main surfaces, namely, the top and bottom surfaces, of the cathode conductor layer 3 are covered by metal plates (cathode terminals 5a and 5b) rather than by molding resin constituents.

The solid electrolytic capacitor according to the embodiment is fabricated as follows. First, the surface of aluminum foil is roughened by etching to enlarge the area of the surface. Then, the aluminum, which is a base metal, is oxidized by anodal oxidization so as to form a thin film (not shown) of aluminum oxide (Al 203) on the surface of the foil, thereby producing an anode member 2. As the base material valve metal for the anode member, a porous thin plate may be used in place of the etched aluminum foil. The thin plate is made by pressing tantalum powder into a thin plate, and sintering the thin plate. Alternatively, another valve metal, such as niobium, may be used. Other conventional, publicly known materials and/or methods may be applied.

A solid electrolyte layer, a graphite layer, and a layer made of a conductive adhesive agent (none of the layers being shown) are deposited in this order on the aluminum oxide film, covering the majority of the anode member 2, so as to form the cathode conductor layer 3. For the solid electrolyte, a conductive polymer, or a semiconductor, such as manganese dioxide or TCNQ may be used. It is well known that a conductive polymer exhibits higher electrical conductivity than other solid electrolytes. Hence, it is appropriate to use a conductive polymer as the solid electrolyte when one of the major objects is to achieve reduced ESR of a capacitor, as in the case of the present invention. When a conductive polymer is used, a monomer, such as pyrrole, thiophene, or aniline, is polymerized using chemical oxidative polymerization or electrolytic oxidative polymerization, or the like. The graphite layer is formed by applying a graphite paste made of graphite and a resin binder. The layer made of a conductive adhesive agent is formed by applying a conductive paste composed of metal powder, such as silver or copper, and a resin binder.

Subsequently, in one of the major surfaces of the anode member 2, namely, the top surface shown in FIG. 2, an insulating resin is applied to the surface that does not have the cathode conductor layer 3 so as to form an insulating portion 8. Furthermore, in the other major surface of the anode member 2, namely, the bottom surface shown in FIG. 2, an anode terminal 4 is connected to the portion free of the cathode conductor layer 3, that is, the surface opposing the insulating portion 8 with the anode member 2 located therebetween. As the material for the anode terminal 4, copper, brass, or phosphor bronze that is advantageously used for connection by soldering and exhibits high electrical conductivity. For connection with the anode member 2, such a process as laser welding or ultrasonic welding is used. Meanwhile, a metal plate (the cathode terminal 5a) is bonded to the lower surface of the cathode conductor layer 3. Furthermore, another metal plate (the cathode terminal 5b) is bonded to the upper surface of the cathode conductor layer. The cathode terminals 5a and 5b, respectively, have surface areas that are slightly larger than the surface areas of their corresponding cathode conductor layers so as to cover the upper and lower surfaces of the cathode conductor layer 3. The cathode terminals 5a and 5b are bonded by the conductive adhesive agent of the topmost layer of the cathode conductor layer 3. The cathode terminal 5a on the upper surface side is shaped so as to cover also the insulating portion 8. Copper, 42 alloy, or nickel silver is mainly used as the material for the cathode terminals 5a and 5b. There is no particular rule in the sequence of the formation of the insulating portion 8, the connection of the anode terminal 4, the bonding of the cathode terminal 5a, and the bonding of the cathode terminal 5b as long as the cathode terminal 5a is bonded after the insulating portion 8 is formed. The remaining steps may not necessarily be as shown above.

In the capacitor in accordance with the present invention, the major surfaces of the cathode conductor layer 3 are closed by the two, namely, the top and bottom, cathode terminals 5a and 5b. These metal plates 5a and 5b prevents the entry of oxygen and/or moisture through the portions having the largest area of the cathode conductor layer 3. This secures reliability. The cathode conductor layer is sandwiched by the metal plates thereby to obviate the need for the thick coating by a molding resin, which has conventionally been required. Thus, a thinner capacitor can be obtained.

In addition, the distance from the anode member 2 to the portions of the anode terminal and the cathode terminal for external connection can be minimized, and a larger area of contact between both terminals 4, 5 and the anode member 2 can be secured, making it possible to control an increase in internal resistance produced due to the connection of the terminals.

Figure 3:
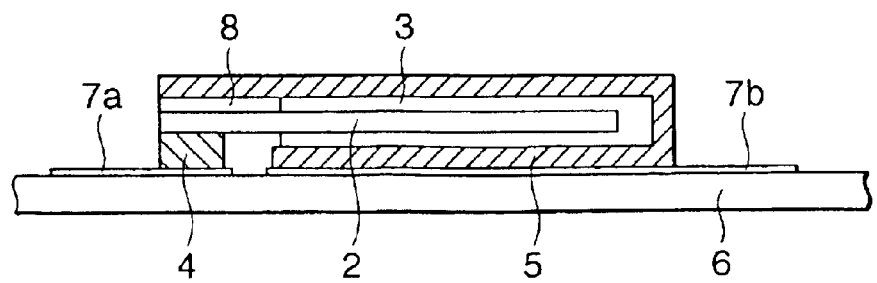
FIG. 3 is a sectional view of a conventional surface-mounted solid electrolytic capacitor.

Referring now to FIG. 3, an exemplary modification of the solid electrolytic capacitor according to the embodiment will be described. FIG. 3 illustrates the section of the exemplary modification. As shown in FIG. 3, the solid electrolytic capacitor according to the modification is formed on a single cathode terminal 5 rather than two separate metal plates, namely, the upper cathode terminal 5a and the lower cathode terminal 5b. The cathode terminal 5 is bent into a U shape along an anode member 2 at the opposite end from an anode terminal 4 such that it wraps the anode member 2. This configuration prevents oxygen and/or moisture from entering through a side end of the anode member 2, so that further improved reliability can be achieved in addition to the advantages obtained by the foregoing embodiment.

It is also advantageous in that the design requires the single metal plate be bent, meaning that the manufacturing process will not be complicated much.

The cathode terminals 5a, 5b in the embodiment, or the cathode terminal 5 in the exemplary modification do not have to be formed of rigid plates; they may alternatively be formed of foil as long as it blocks ventilation.

As described above, the present invention makes it possible to provide a surface-mounted electrolytic capacitor that is thinner and has smaller ESR without causing deterioration in reliability attributable to the entry of oxygen and/or moisture from outside, as compared with a conventional capacitor coated with a molding resin.

What is claimed is:

1. A solid electrolytic capacitor comprising:
   an anode terminal and a cathode terminal for external electrical connection that are formed on one surface of a plate-like or foil-like anode member;
   a cathode conductor layer formed such that it covers the area of the one surface of the anode member except for the portion where the anode terminal is secured;
   a first metal plate or metal foil functioning as the cathode terminal that is closely joined to the one surface of the cathode conductor layer so as to cover the one surface of the cathode conductor layer; and
   a second metal plate or metal foil closely joined to the other surface of the cathode conductor layer so as to cover the other main surface of the cathode conductor layer,
   wherein the ventilation between the anode member and the outside is blocked by the first metal plate or metal foil and the second metal plate or metal foil.

2. A solid electrolytic capacitor comprising:
   an anode member that uses a plate-like or foil-like valve metal as its base material and has a layer formed of an oxide of the valve metal on the surface thereof;
   a cathode conductor layer that is formed to cover the area of the surface of the anode member except for a predetermined area, and includes a solid electrolyte layer and a layer of a conductive adhesive agent;
   an anode terminal conductively secured to a predetermined area of one surface of the anode member, and formed to provide external electrical connection,
   a first metal plate or metal foil that is bonded to a conductive adhesive agent and functions as a first cathode terminal formed on the one surface of the cathode conductor layer for external electrical connection such that it covers the one surface of the cathode conductor layer; and
   a second metal plate or metal foil that is bonded to a conductive adhesive agent and formed on the other surface of the cathode conductor layer such that it covers the other surface of the cathode conductor layer,
   wherein the ventilation between the anode member and the outside is blocked by the first metal plate or metal foil and the second metal plate or metal foil.

3. The solid electrolytic capacitor as claimed in claim 1, wherein the first metal plate or metal foil and the second metal plate or metal foil are formed of the same single metal plate or metal foil, and
   wherein the cathode conductor layer is bent along the configuration of the anode member at the opposite end from the surface where the anode terminal is secured to the anode member, the cathode conductor layer having a U-shaped section.

4. The solid electrolytic capacitor as claimed in claim 1, wherein the cathode conductor layer includes a solid electrolyte layer and a layer of a conductive adhesive agent, and a conductive polymer is used for the solid electrolyte.

5. The solid electrolytic capacitor according to claim 1, wherein the base material of the anode member is aluminum foil.

6. The solid electrolytic capacitor as claimed in claim 2, wherein the first metal plate or foil and the second metal plate or metal foil are formed of the same single metal plate or metal foil, and
   wherein the cathode conductor layer is bent along the configuration of the anode member at the opposite end from the surface where the anode terminal is secured to the anode member, the cathode conductor layer having a U-shaped section.

7. The solid electrolytic capacitor as claimed in claim 2, wherein the cathode conductor layer includes a solid electrolyte layer and a layer of a conductive adhesive agent, and a conductive polymer is used for the solid electrolyte.

8. A method for manufacturing a solid electrolytic capacitor having an anode terminal and a cathode terminal for external electrical connection that are formed on one surface of a plate-like or foil-like anode member, the manufacturing method including:
   a first step of forming the anode member by increasing the area of a plate-like or foil-like valve metal and depositing a layer of oxide of a base material valve metal on the surface of the increased area;
   a second step of forming a cathode conductor layer formed such that it covers the area of the one surface of the anode member except for the portion where the anode terminal is secured;
   a third step of forming electroconductively the anode terminal to the portion of the anode member that is not covered by the cathode conductor layer;
   a fourth step of bonding, to one surface of the cathode conductor layer, a first metal plate or metal foil that has an area larger than the area of the cathode conductor layer on that surface side and functions as the cathode terminal; and
   a fifth step of bonding, to the other surface of the cathode conductor layer, a second metal plate or metal foil having an area larger than the area of the cathode conductor layer on that surface side.

9. The method for manufacturing a solid electrolytic capacitor as claimed in claim 8,
   wherein the second step includes:
   a sixth step of forming a solid electrolyte layer; and
   a seventh step of forming a layer of a conductive adhesive agent on a topmost layer of the cathode conductor layer.

10. The method for manufacturing a solid electrolytic capacitor as claimed in claim 8,
wherein the cathode conductor layer includes a solid electrolyte layer and a layer of a conductive adhesive agent, and a conductive polymer is used for the solid electrolyte.

11. The method for manufacturing a solid electrolytic capacitor as claimed in claim 10,
wherein the base material of the anode member is aluminum foil.

12. The solid electrolytic capacitor according to claim 2, wherein the base material of the anode member is aluminum foil.

\* \* \* \* \*

UNITED STATES PATENT AND TRADEMARK OFFICE
CERTIFICATE OF CORRECTION

PATENT NO. : 6,765,784 B2
APPLICATION NO. : 10/369473
DATED : July 20, 2004
INVENTOR(S) : Kazumasa Ohya It is certified that error appears in the above-identified patent and that said Letters Patent is hereby corrected as shown below:

Column 4, line 36:

change "the lower surface" to --the upper surface--.

Column 4, line 38:

change "the upper surface" to --the lower surface--.

Signed and Sealed this

Twelfth Day of August, 2008

JON W. DUDAS
*Director of the United States Patent and Trademark Office*